United States Patent
Mingasson et al.

[11] 3,849,331
[45] Nov. 19, 1974

[54] 4-NAPHTHALIMIDO CYCLOAMMONIUM-ACRYLIC FIBER COMPOSITIONS

[75] Inventors: Georges Raymond Henry Mingasson, Paris; Annick Marthe Suzanne Simone Domergue, Eaubonne, both of France

[73] Assignee: Ugine Kuhlmann, Paris, France

[22] Filed: Dec. 1, 1971

[21] Appl. No.: 203,918

Related U.S. Application Data

[62] Division of Ser. No. 751,349, Aug. 9, 1968, Pat. No. 3,649,633.

[30] Foreign Application Priority Data
Aug. 11, 1967 France .............................. 67.117728

[52] U.S. Cl. ................ 252/301.2 W, 8/1 W, 8/177, 260/281
[51] Int. Cl. ............................................. C09k 1/02
[58] Field of Search ............ 260/281, 88.7 B; 8/177; 252/301.2 W

[56] References Cited
UNITED STATES PATENTS

| | | | |
|---|---|---|---|
| 3,247,208 | 4/1966 | Schenker | 260/281 |
| 3,310,564 | 3/1967 | Kasai | 260/281 |
| 3,330,834 | 7/1967 | Sensitu et al. | 260/281 |
| 3,624,080 | 11/1971 | Dimroth | 260/281 X |
| 3,625,947 | 12/1971 | Nogouchi | 260/281 |
| 3,649,633 | 3/1972 | Mingasson et al. | 260/281 |
| 3,697,525 | 10/1972 | Okada et al. | 260/281 |
| 3,798,224 | 3/1974 | Hirakata et al. | 260/281 |
| 3,804,837 | 4/1974 | Mingasson | 260/270 |
| 3,804,838 | 4/1974 | Mingasson | 260/270 |

FOREIGN PATENTS OR APPLICATIONS
| | | | |
|---|---|---|---|
| 39-27, 127 | 11/1964 | Japan | 260/281 |

OTHER PUBLICATIONS
Rice et al., Jour. Med. Chem. Vol. 11, p. 183–185 (Jan 68).

Primary Examiner—Donald G. Daus
Assistant Examiner—Ralph D. McCloud
Attorney, Agent, or Firm—Browne, Beveridge, DeGrandi & Kline

[57] ABSTRACT

Acrylic fibre-bleaching cation composition of matter in which the cation has the formula:

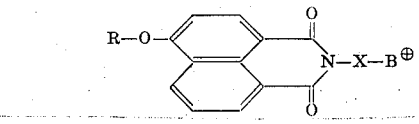

in which R is an alkyl radical or a hydroxy or alkoxy substituted alkyl radical, said alkyl having one to four carbon atoms, X is a direct linkage or p-phenylene, $B^+$ is an $N^+$ - (lower alkyl) cycloammonium group attached to X through a carbon atom, the remaining carbon atoms in $B^+$ being unsubstituted or substituted by chlorine, lower alkyl, phenyl or methylthio group.

5 Claims, No Drawings

4-NAPHTHALIMIDO CYCLOAMMONIUM-ACRYLIC FIBER COMPOSITIONS

This application is a divisional application of copending application Ser. No. 751,349 filed Aug. 9, 1968, now U.S. Pat. No. 3,649,633.

The present invention concerns new optical bleaching agents, their preparation and their applications.

The agents of this invention are novel cationic organic compounds which can be used as fluorescent brightening agents for fibres based on acrylonitrile polymers or copolymers and they are derivatives of naphthalic anhydride corresponding to the general formula:

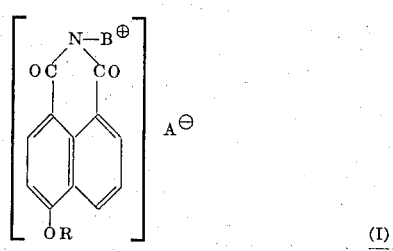

(I)

in which R represents an alkyl radical, $B^+$ represents a cycloammonium group and A represents a colourless monovalent anion.

The radical R is preferably an alkyl radical containing from one to four carbon atoms for example, methyl, ethyl, propyl or isopropyl groups. These radicals may be substituted by at least one non-chromophore and non-anionic substituent such as for example a hydroxy or alkoxy group.

By "cycloammonium group" is meant a mono- or poly-cyclic heterocyclic group containing one or more hetero atoms, the hetero atom or one of the hetero atoms being a quaternary nitrogen atom. Examples of such groups are pyridinium, imidazolium, benzimidazolium, pyrazolium, pyrazolinium, triazolium, thiazolium, benzothiazolium, oxazolium, isoxazolium, benzo-oxazolium, oxadiazolium, thiadiazolium, quinolium and indazolium rings. These rings may be substituted by at least one non-chromophore and non-anionic substituent. They may be attached through a carbon atom to naphthalimido group either by a direct linkage or by a p-phenylene radical.

The cationic organic compounds of the invention are salts which are soluble in water, and their aqueous solutions show an intense green-blue fluorescence. They have a good affinity for synthetic fibres based on acrylonitrile polymers or copolymers, with which they form true compounds, the cations being attached at the negative positions of the fibre. They impart to the acrylic fibres a remarkable effect of whiteness which persists on repeated washing and is stable to light and steaming and fast to chlorine.

Alkoxylated derivatives of naphthalimides are already known. Anselm and Zuckmeyer (Ber., 1899, 32, p. 3,291) have prepared 4-methoxy-N-methylnaphthalimide. Similarly French Pat. Nos. 1,322,849 and 1,344,883 and U.S. Pat. No. 3,310,564 describe 4-alkoxy-naphthalimides in which the nitrogen atom is substituted by hydrocarbon radicals. These substances are insoluble in water, which makes their application complicated owing to the fact that they have to be very finely dispersed. Those which have a fluorescent brightening action on acrylic fibres owe it to absorption by the fibre, but not to a true chemical combination with the latter.

The compounds of formula (I) can be prepared for example by reacting an alkylating agent of formula A-alkyl wherein A has the meaning given above, for example, an alkyl halide, sulphate or sulphonate, with a compound of the general formula:

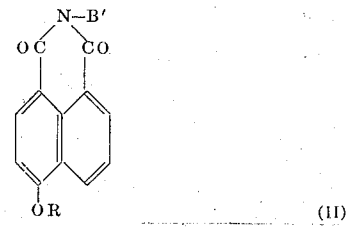

(II)

in which R has the meaning given above and B' represents a heterocyclic, mono- or poly-cyclic group containing one or more atoms of nitrogen or one or more hetero-atoms one of which is a nitrogen atom, possibly in the presence of a solvent such as for example an aromatic hydrocarbon or a chlorinated derivative thereof, an alcohol or dimethyl formamide. The preferred alkylating agent is an alkyl sulphate such as, for example, methyl sulphate.

The compounds of formula (II) may be obtained for example by any of several known processes, for example by the condensation of a 4-alkoxy-naphthalic anhydride, and especially 4-methoxy-naphthalic anhydride (C.1926, II, p.2817 — J. Chem. Soc. 1939, p.792), with a heterocyclic primary amine of the formula:

B' — NH$_2$ (III)

in which B' has the meaning given above.

It is also possible to prepare the compounds of formula II from 4-bromo-naphthalimides of the formula:

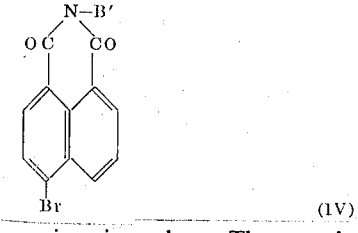

(IV)

in which B' has the meaning given above. These naphthalimides may be obtained by condensing 4-bromo-naphthalic anhydride, prepared by the method of Rule and Thompson (J. CHem.Soc., 1937, p. 1764), with an amine of formula (III) by a process described by Bradley and Pexton (J.Chem.Soc., 1954, p. 4435). This condensation is preferably carried out in a solvent such as for example water, alcohol or a hydrocarbon, at a temperature between 100° C. and 200° c. Ethylene glycol and diethylene glycol, which can be used in a very wide range of temperature, are particularly suitable solvents. The bromonaphthalimides of formula (IV) can then be converted into alkoxynaphthalimides of the formula (II), owing to the mobility of the bromine atom. This property is pointed out by Graebe (Liebigs Ann., 327, p. 87) and by Bradley and Pexton (J. Chem. Soc., 1954, p.4434). For this conversion the bromonaphthalimides of formula (IV) may be treated in an excess of alcohol ROH at the boiling point or under pressure with an alkali metal alcoholate of formula ROMe, in which R has the meaning given above and Me is an alkali metal, preferably sodium.

The quaternary salts of formula (I) are very soluble in water, and their solutions are extremely fluorescent in daylight and still more under the influence of ultraviolet rays. They may be applied to fibres based on acrylonitrile polymers or copolymers such as those sold under the trade names "Orlon," "Courtelle," "Crylor," or "Dralon," either by dyeing in a bath having a pH of from 4 to 7 or by any other process such as for example thermo-fixation or incorporation in the mass during spinning. A very small amount of the product, of the order of 0.1 to 0.4 percent is sufficient to obtain an excellent whitening effect.

The naphthalimides of the formulae (II) or (IV) are new compounds but for the most part they have weak fluorescent properties and an affinity for fibres which is too small to have an optical bleaching effect of any interest. In these circumstances it was unexpected that the conversion of the naphthalimides of formula (II) into their quaternary derivatives would considerably increase the fluorescence of these compounds.

The following Examples 1 to 61 illustrate the preparation of these intermediate products. Examples 62 to 84 illustrate the preparation of cycloammonium derivatives of naphthalimides according to the invention. Examples 85 and 86 illustrate the use of the cycloammonium derivatives on acrylic fibres. These Examples are purely illustrative and the parts given are parts -pyrazolyl)-naphthalimide, weight.
Naphthalimides of formula (IV)

EXAMPLE 1

14 parts of 4-bromo-naphthalic anhydride are condensed with 5.2 parts of 2-aminopyridine in 100 parts of ethylene glycol by heating the mixture for 5 hours at 130°–140° C. After cooling, the precipitate is filtered off, washed with water and dried. 17.4 parts of 4-bromo-N-(2-pyridyl)-naphthalimide, melting at 247°–248° C. are obtained, of the formula:

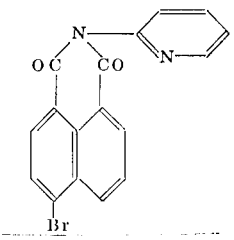

EXAMPLE 2

A mixture of 27 parts of 4-amino-3,5-dimethyl-pyrazole, 65 parts of 4-bromo-naphthalic anhydride and 500 parts of water is boiled under reflux for 5 hours. It is then left to cool, and the precipitate is filtered off, washed with water and dried. 85 parts of 4-bromo-N-(3,5-dimethyl-4-pyrazoyl)-naphthalimide, melting at 267° C, are obtained, of the formula:

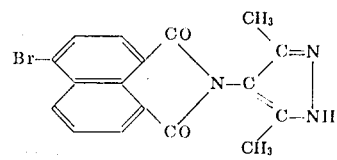

on replacing the 2-aminopyridine in Example 1 with other heterocyclic amines B'—NH₂, and operating in a similar way, the following bromo-naphthalimides are obtained:

| Example | B'-NH₂ | Naphthalimides of formula IV | M.p.° C |
| --- | --- | --- | --- |
| 3 | 3-aminopyridine | 4-bromo-N-(3-pryridyl)-naphthalimide | 217 |
| 4 | 2-amino-6-methyl-pyridien | 4-bromo-N-(6-methyl-2-pyridyl)-naphthalimide | 238 |
| 5 | 2-aminothiazole | 4-bromo-N-(2-thiazolyl)-naphthalimide | 298 |
| 6 | 2-amino-4-methyl-thiazole | 4-bromo-N-(4-methyl-2-thiazolyl)-naphthalimide | 248 |
| 7 | 2-amino-benzo-thiazole | 4-bromo-N-(2-benzothiazolyl)-naphthalimide | 300 |
| 8 | 6-amino-2-phenyl-benzothiazole | 4-bromo-N-(2-phenyl-6-benzothiazolyl)-naphthalimide | 308 |
| 9 | 4'-amino-2-phenyl-benzothiazole | 4-bromo-N-[4-(2-benzothiazolyl)-phenyl]-naphthalimide | 326 |
| 10 | 2-amino-benzoxazole | 4-bromo-N-(2-benzoxazolyl)-naphthalimide | 285 |
| 11 | 5-amino-3-methyl-isoxazole | 4-bromo-N-(3-methyl-5-isoxazolyl)-naphthalimide | 295 |
| 12 | 6-amino-2-methyl-quinoline | 4-bromo-N-(2-methyl-6-quinolyl)-naphthalimide | 287 |
| 13 | 2-amino-benzimidazole | 4-bromo-N-(2-benzimidazolyl)-naphthalimide | 335 |
| 14 | 6-amino-1,2-diemthyl-benzimidazole | 4-bromo-N-(1,2-diemthyl-6-benzimidazolyl)-naphthalimide | 325 |
| 15 | 4'-amino-2-phenyl-benzimidazole | 4-bromo-N-[4-(2-benzimidazolyl)-phenyl]-naphthalimide | 320 |
| 16 | 4'-amino-2-phenyl-1-methyl-benz-imidazole | 4-bromo-N-[4-(1-methyl-2-benzimidazolyl)-phenyl]-naphthalimide | 273 |
| 17 | 6-amino-indazole | 4-bromo-N-(6-indazolyl)-naphthalimide | 305 |
| 18 | 3-amino-6-chloro-indazole | 4-bromo-N-(6-chloro-3-indazolyl)-naphthalimide | 325 |
| 19 | 2-amino-5-methyl-thio-thia-diazole | 4-bromo-N-(5-methylthio-2-thiadiazolyl)-naphthalimide | 240 |

—Continued

| Example | B'-NH₂ | Naphthalimides of formula IV | M.p.° C |
|---------|--------|------------------------------|---------|
| 20 | 3-amino-4-phenyl-pyrazole | 4-bromo-N-(4-phenyl-3-pyrazolyl)-naphthalimide | 298 |
| 21 | 3-amino-5-phenyl-pyrazole | 4-bromo-N-(5-phenyl-3-pyrazolyl)-naphthalimide | 286 |
| 22 | 3-amino-5-methyl-4-phenyl-pyrazole | 4-bromo-N-(5-methyl-4-phenyl-3-pyrazolyl)-naphthalimide | 302 |
| 23 | 4-amino-3-methyl-5-phenyl-pyrazole | 4-bromo-N-(3-methyl-5-phenyl-4-pyrazolyl)-naphthalimide | 254 |
| 24 | 4'-amino-1-phenyl-3,5-dimethyl-pyrazole | 4-bromo-N-[4-(3,5-dimethyl-1-pyrazolyl)-phenyl]-naphthalimide | 245 |
| 25 | 4'-amino-1-phenyl-3,5,5-trimethyl-Δ2-pyrazoline | 4-bromo-N-[4-(3,5,5-trimethyl-1-Δ2-pyrazolinyl)-phenyl]-naphthalimide | 238 |
| 26 | 3-amino-1,2,4-4H-triazole | 4-bromo-N-(1,2,4-4H-triazol-3-yl)-naphthalimide | >350 |
| 27 | 3-amino-5-phenyl-1,2,4-4H-triazole | 4-bromo-N-(5-phenyl-1,2,4-4H-triazol-3-yl-naphthalimide | 345 |
| 28 | 4-amino-1,2,4-4H-triazole | 4-bromo-N-(1,2,4-4H-triazol-4-yl)-naphthalimide | 350 |
| 29 | 4'-amino-3-phenyl-5-methyl-1,2,4-4H-triazole | 4-bromo-N-[4-(5-methyl-1,2,4-4H-triazol-3-yl)-phenyl]-naphthalimide | 300 |

Naphthalimides of formula (II)

EXAMPLE 30

4 parts of sodium are dissolved in 250 parts by volume of methyl alcohol in an apparatus provided with a stirrer and a reflux condenser. Then 14.12 parts of 4-bromo-N-(2-pyridyl)-naphthalimide are added and the mixture is heated under reflux for 3 hours. The reaction mixture thickens and becomes a pale yellow colour. After cooling, the precipitate is filtered off, taken up in dilute acetic acid, filtered and washed with water, then with alcohol. After drying, 11.3 parts of 4-methoxy-N-(2-pyridyl)-naphthalimide of melting point 240° C. are obtained. On recrystallising from a mixture of alcohol and dimethyl formamide, the product forms long yellow needles melting at 242° C.

By application of the same process to the 4-bromo-naphthalimides of Examples 2 to 29, the corresponding 4-methoxy-naphthalimides are obtained, the melting points of which are given below:

| Example | Initial 4-bromo-naphthalimide | | M.p. of the 4-methoxy derivative in °C |
|---------|-------------------------------|---|----------------------------------------|
| 31 | Example | 2 | 255 |
| 32 | do. | 3 | 255 |
| 33 | do. | 4 | 204 |
| 34 | do. | 5 | 250 |
| 35 | do. | 6 | 235 |
| 36 | do. | 13 | 260 |
| 37 | do. | 14 | 300 |
| 38 | do. | 15 | 309 |
| 39 | do. | 16 | 264 |
| 40 | do. | 17 | 310 |
| 41 | do. | 18 | >350 |
| 42 | do. | 19 | decomposition |
| 43 | do. | 20 | 278 |
| 44 | do. | 21 | 292 |
| 45 | do. | 22 | 290 |
| 46 | do. | 23 | 250 |
| 47 | do. | 24 | 247 |
| 48 | do. | 25 | 265 |
| 49 | do. | 26 | >350 |
| 50 | do. | 27 | 350 |
| 51 | do. | 28 | 345 |
| 52 | do. | 29 | 305 |

EXAMPLE 53

A mixture of 11.4 parts of 4-methoxy-naphthalic anhydride with 4.7 parts of 2-aminopyridine and 100 parts of ethylene glycol is heated for 6 hours at 150°–160° C. with stirring. After cooling, filtering off the precipitate, washing with alcohol and drying, 13 parts of a product similar to that from Example 30 are obtained.

On operating as in the preceding Example, but replacing the 2-aminopyridine by equivalent quantities of the following heterocyclic amines the corresponding 4-methoxy-naphthalimides are obtained:

| Example | B'-NH₂ | Naphthalimides of formula II | M.p.°C |
|---------|--------|------------------------------|--------|
| 54 | 2-amino-benzothiazole | 4-methoxy-N-)2-benzothiazolyl)-naphthalimide | 220 |
| 55 | 6-amino-2-phenyl-benzothiazole | 4-methoxy-N-(2-phenyl-6-benzothiazolyl)-naphthalimide | 350 |
| 56 | 2-amino-benzoxazole | 4-methoxy-N-(2-benzoxazolyl)-naphthalimide | >320 |
| 57 | 6-amino-2-phenyl-benzoxazole | 4-methoxy-N-(2-phenyl-6-benzoxazolyl)-naphthalimide | 336 |
| 58 | 6-amino-2-methyl-quinoline | 4-methoxy-N-(2-methyl-6-quinolyl)-naphthalimide | 255 |
| 59 | 2-amino-4-methyl-quinoline | 4-methoxy-N-(4-methyl-2-quinolyl)-naphthalimide | 262 |

EXAMPLE 60

4 parts of sodium are dissolved in 200 parts by volume of anhydrous ethyl alcohol in a round-bottomed flash provided with a stirrer and a reflux condenser. 14.12 parts of 4-bromo-N-(2-pyridyl)-naphthalimide are added and the mixture is refluxed for 3 hours. After cooling, the precipitate is filtered off, washed with a little alcohol, then with water until the filtrate is neutral, and dried. 4-ethoxy-N-(2-pyridyl)-naphthalimide of melting point 232° C is thus obtained.

EXAMPLE 61

On replacing the 4-bromo-N-(2-pyridyl)-naphthalimide in the preceding Example by 13.7 parts of 4-bromo-N-(1,2,4-4H-triazol-3-yl)-naphthalimide, 4-ethoxy-N-(1,2,4-4H-triazol-3yl)-naphthalimide of melting point 338° C. is obtained.
Naphthalimides of formula (I)

EXAMPLE 62

10 parts of methyl sulphate are introduced into an apparatus provided with a stirrer and a thermometer and are heated to 100° C. and 10 parts of 4-methoxy-N-(2-pyridyl)-naphthalimide are then gradually introduced. The temperature of the mixture is raised to 130°C. and this temperature is maintained for about an hour, until a sample taken is completely soluble in water. The product is allowed to cool, diluted with 50 parts of water and left with stirring to decompose the excess methyl sulphate. It is then boiled with a little decolorising charcoal and filtered. After cooling, 10 parts of sodium chloride are added to the filtrate, then a dilute solution of zinc chloride, until precipitation is complete. After filtering and drying the precipitate, 12 parts of the chlorozincate of 4'-methoxy-2-naphthalimido-1-methyl-pyridinium monohydrate are obtained. After recrystallising from water, analysis gives the following figures:

Calculated for $C_{19}H_{15}N_2O_3Cl + \frac{1}{2} ZnCl_2 + H_2O$ :
| | % : | C 51.8 | H 3.86 | N 6.36 | Cl 16.1 |
|---|---|---|---|---|---|
| Found | % : | 51.96 | 3.90 | 6.70 | 16.7 |

This product is in the form of a light beige crystalline powder, and is very soluble in water. Its dilute aqueous solutions show an intense blue fluorescence.

EXAMPLE 63

5.2 parts of 4-methoxy-N-(2-benzimidazolyl)-naphthalimide are dissolved in 25 parts of dimethyl formamide. 3 parts of methyl sulphate are added and the mixture is heated at 130° C. until a sample is soluble in water. After cooling, 50 parts of water are added, the product is boiled with a little decolorising charcoal and filtered. Sodium chloride is added to the filtrate. A light yellow crystalline product is precipitated. 5 parts of 4'-methoxy-2-naphthalimido-1,3-dimethyl-benzimidazolium chloride are thus obtained. After recrystallising from water, analysis gives the following results:

| | Calculated for $C_{22}H_{18}N_3O_3Cl, H_2O$ | % : | C 62.06 | H 4.7 | N 9.87 |
|---|---|---|---|---|---|
| Found | | % : | 61.7 | 5 | 9.49 |

This compound gives extremely fluorescent aqueous solutions.

EXAMPLE 64

8 parts of 4-methoxy-N-[4-(3,5-dimethyl-1-pyrazolyl)-phenyl]-naphthalimide (Example 47) are heated under reflux in 100 parts by volume of chlorobenzene and 5 parts of methyl sulphate are introduced in a period of an hour. The mixture is boiled for 2 hours and the solvent is removed by steam distillation. The solution is treated with carbon black, filtered, then cooled. The chlorozincate of 4''-methoxy-4'-naphthalimido-1-phenyl-2,3,5-trimethyl-pyrazolium is precipitated by the addition of salt and a solution of zinc chloride.

EXAMPLE 65

3 parts of 4-methoxy-N-(1,2,4-4H-triazol-4-yl)-naphthalimide from Example 51 are gradually introduced into 5 parts of ethyl sulphate heated to 130° C. This temperature is maintained until a sample is soluble in water. The mass is dissolved in water. The solution is boiled with decolorising charcoal, filtered and sodium chloride and zinc chloride are added to the cooled solution. 4'-methoxy-4-naphthalimido-1-ethyl-(or 2-ethyl)-triazolium chlorozincate is thus obtained in the form of a light yellow powder which is soluble in water with an intense blue fluorescence.

EXAMPLES 66 to 84

On operating in a similar way according to one of the processes described in Examples 62, 63 and 64 the salts (chlorozincate or methyl sulphate) of other cycloammonium derivatives of formula (I) are obtained from 4-alkoxy-naphthalimides of formula (II) and previously described.

| Example | Naphthalimide of formula II of Example: | Naphthalimide of formula I |
|---|---|---|
| 66 | 33 | 4'- methoxy-2-naphthalimido-1,6-dimethyl-pyridinium (chlorozincate) |
| 67 | 34 | 4'- methoxy-2-naphthalimido-3-methyl-thiazolium (chlorozincate) |
| 68 | 35 | 4'- methoxy-2-naphthalimido-3,4-diemthyl-thiazolium (chlorozincate) |
| 69 | 55 | 4'- methoxy-6-naphthalimido-2-phenyl-3-methyl-benzothiazolium (chlorozincate) |
| 70 | 59 | 4'- methoxy-2-naphthalimido-1,4-dimethyl-quinolium (chlorozincate) |
| 71 | 58 | 4'- methoxy-6-naphthalimido-1,2-dimethyl-quinolium (chlorozincate) |
| 72 | 37 | 4'- methoxy-6-naphthalimido-1,2,3-tri-methyl-benzimidazolium (chlorozincate) |

— Continued

| Example | Naphthalimide of formula II of Example: | Naphthalimide of formula I |
|---|---|---|
| 73 | 38 | 4''- methoxy-4'-naphthalimido-2-phenyl-1,3-dimethyl-benzimidazolium (chlorozincate) |
| 74 | 40 | 4'- methoxy-6-naphthalimido-1,2-dimethyl-indazolium (chlorozincate) |
| 75 | 43 | 4'- methoxy-3-naphthalimido-4-phenyl-1,2-dimethyl-pyrazolium (methyl sulphate) |
| 76 | 44 | 4'- methoxy-3-naphthalimido-5-phenyl-1,2-dimethyl-pyrazolium (chlorozincate) |
| 77 | 45 | 4'- methoxy-3-naphthalimio-4-phenyl-1,2,5-trimethyl-pyrazolium (methyl sulphate) |
| 78 | 31 | 4'- methoxoy-4-naphthalimido-1,2,3,5-tetramethyl-pyrazolium (chlorozincate) |
| 79 | 46 | 4'- methoxy-4-naphthalimido-5-phenyl-1,2,3-trimethyl-pyazolium (chlorozincate) |
| 80 | 47 | 4''- methoxy-4'-naphthalimido-1-phenyl-2,3,5-trimethyl-pyrazolium (chlorozincate) |
| 81 | 49 | 4'- methoxy-3-naphthalimido-2,4-dimethyl-triazolium (chlorozincate) |
| 82 | 50 | 4'- methoxy-3-naphthalimido-5-phenyl-2,4-diemthyl-triazolium (chlorozincate) |
| 83 | 51 | 4'- methoxy-4-naphthalimido-1(or 2)-methyl-triazolium (chlorozincate) |
| 84 | 52 | 4''- methoxy-4'-naphthalimido-3-phenyl-2,4,5-trimethyl-triazolium (chlorozincate) |

EXAMPLE 85

A treatment bath is prepared with 3,000 parts of water, 3 parts of acetic acid and 0.4 parts of the benzimidazolium salt of Example 63. It is heated to 40°–50° C. and 100 parts of an "Orlon" fabric are introduced. The bath is heated to boiling and maintained at this for an hour. The fabric is removed, rinsed and dried. It has attained a remarkable whiteness. The same effect is obtained on a fabric where the "Orlon" fibres have been replaced by "Courtelle," "Crylor" or "Dralon" fibres.

EXAMPLE 86

The operation is carried out exactly under the conditions described in Example 85, but 5 parts of sodium chlorite have been previously added to the bath. The optical bleaching effect observed is still more intense.

We claim:

1. A composition of matter consisting of cations and an acrylic fiber having negative positions, said cations being attached at the negative positions of said fiber, in which the cations have the formula:

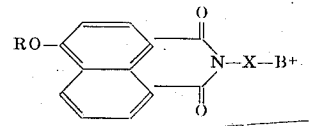

in which R is alkyl or monohydroxy or monoalkoxy substituted alkyls or alkoxy group, said alkyl having one to four carbon atoms, X is a carbon-nitrogen linkage or p-phenylene, $B^+$ is an $N^+$- (lower alkyl) cycloammonium said cycloammonium being a benzimidazolium, pyrazolium, triazolium or thiazolium group, wherein lower alkyl is methyl or ethyl, said cycloammonium group attached to X through a carbon atom, $B^+$ being unsubstituted on the remaining carbon atoms or substituted on said carbon atoms by up to four substituents selected from the group consisting of chlorine, methyl, ethyl, phenyl or methylthio.

2. composition of matter as claimed in claim 1 in which $B^+$ is benzimidazolium.

3. composition of matter as claimed in claim 1 in which $B^+$ is pyrazolium.

4. Composition of matter as claimed in claim 1 in which $B^+$ is triazolium.

5. Composition of matter as claimed in claim 1 in which $B^+$ is thiazolium.

* * * * *